United States Patent [19]

Berg et al.

[11] 4,081,765
[45] Mar. 28, 1978

[54] METHOD AND APPARATUS FOR PROVIDING A CALIBRATED SCAN FOR A SCANNING LASER

[75] Inventors: Anthony D. Berg, Los Altos; William L. Wise, Mountain View, both of Calif.

[73] Assignee: Coherent, Inc., Palo Alto, Calif.

[21] Appl. No.: 692,533

[22] Filed: Jun. 3, 1976

[51] Int. Cl.$^2$ ............................ H01S 3/10; H01S 3/13
[52] U.S. Cl. ..................... 331/94.5 C; 331/94.5 K; 331/94.5 L; 331/94.5 M; 331/94.5 S
[58] Field of Search ............... 331/94.5 C, 94.5 K, 331/94.5 L, 94.5 M, 94.5 S

[56] References Cited
PUBLICATIONS

Wu et al., "CW Dye Laser...," Applied Physics Letters, vol. 25, No. 1, July 1, 1974, pp. 73-75.
Grove et al., Proc. SPIE, vol. 49, pp. 75-79 (1975).
Schuda et al., Appl. Phys. Lett., vol. 22, No. 8, Apr. 15, 1973, pp. 360-362.
Barger et al., Appl. Phys. Lett., vol. 27, No. 1, July 1, 1975, pp. 31-33.

Primary Examiner—William D. Larkins
Attorney, Agent, or Firm—Limbach, Limbach & Sutton

[57] ABSTRACT

Apparatus and a method are disclosed for continuously varying the output radiation frequency of a scanning laser system about a selected nominal output radiation frequency with a calibrated scan. Apparatus is disclosed for continuously varying the resonant frequencies of both the laser cavity and the reference cavity, for controlling this scanning and for calibrating the scan width. A method for calibrating the scan width is also disclosed.

11 Claims, 2 Drawing Figures

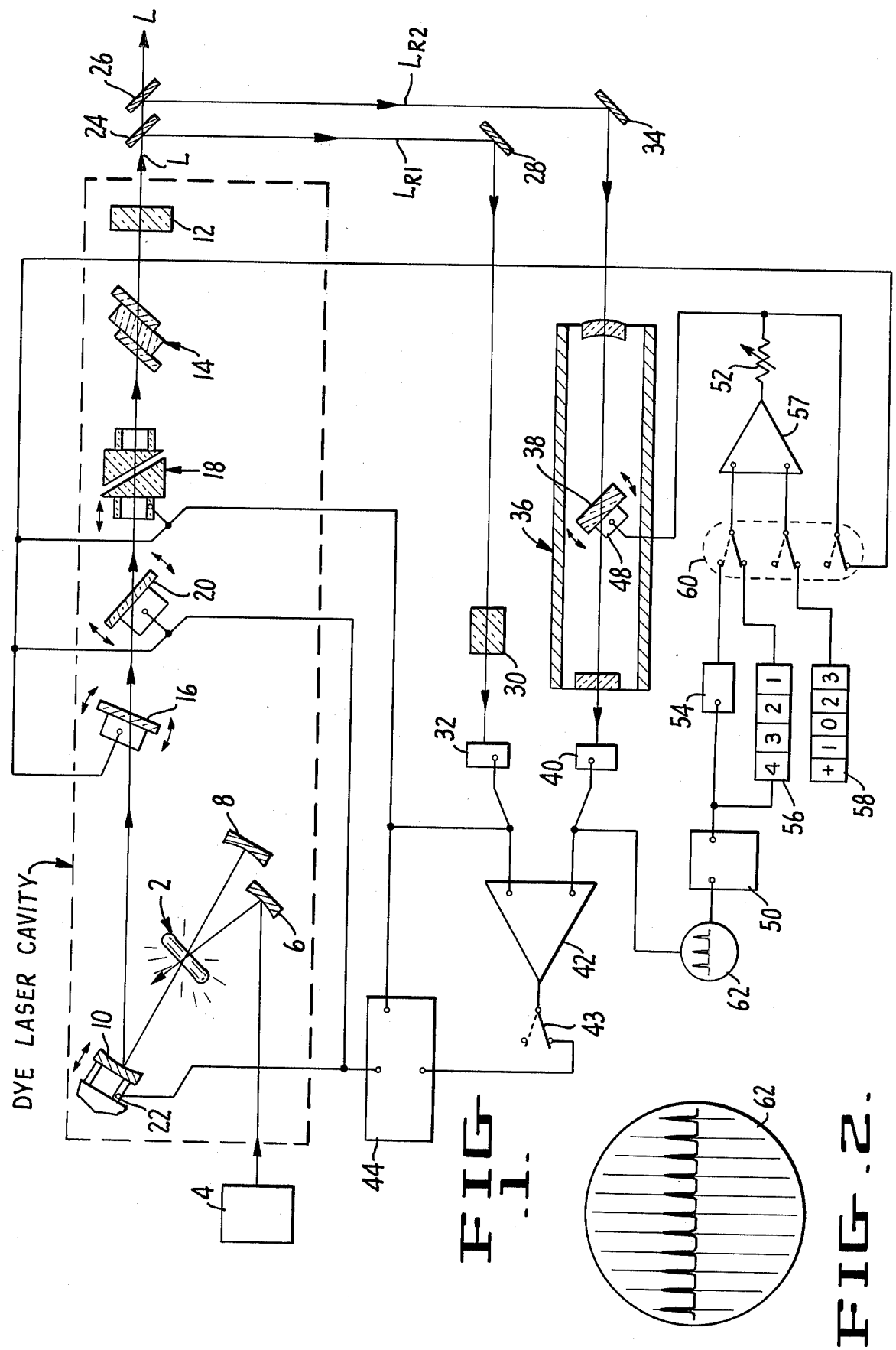

METHOD AND APPARATUS FOR PROVIDING A CALIBRATED SCAN FOR A SCANNING LASER

BACKGROUND OF THE INVENTION

Field of the Invention

This invention relates to frequency scanning laser systems. More particularly, it relates to tunable broadband laser systems and apparatus for continuously varying the output radiation frequency of such a laser system with a calibrated scan width.

In recent years tunable broadband lasers such as dye lasers have attracted much attention as a research tools because of their property of being able to provide output wavelengths over a comparatively large segment of the visible spectrum. The basic structure and manner of operation of dye lasers has now become well known and is disclosed in published literature, including U.S. Pat. No. 3,873,941 to Yarborough et al.

With the advent of the ability to scan the output frequency of the laser a new dimension in precision spectroscopy was provided by illuminating objects of interest with the output radiation from such a laser as it was scanned over a range of output frequencies. However, for maximum scientific usefulness, it became necessary not merely to scan the laser output frequency but to do so in a repeatable manner and over a known range of output frequencies. Such capability is particularly necessary where a broad scan width of, for example, 30 GHz is initially scanned to determine the presence or absence of spectroscopic events within the scan range, and then much narrower identified portions of that scan range are investigated in detail with a narrow scan width. To obtain the desired scan it thus became necessary to develop apparatus and techniques for selecting carefully controlled scan widths and maintaining those scan widths accurately calibrated over the entire operating spectral range of the dye laser from blue (about 400 nanometers wavelength) to red (about 800 nanometers wavelength). The gross variations in output radiation frequency for defining the general spectral region to be scanned may be effected in a conventional manner using conventional apparatus such as the birefringent filter disclosed in U.S. Pat. No. 3,868,592 to Yarborough et al. However, once the general spectral region to be scanned has been selected by such means, it is necessary that the scanning of the laser system be carried out in a more controlled, calibrated manner to provide a high resolution, narrow spectral width scan. One means for achieving controlled scanning is by slaving tuning means within the laser cavity, such as a tipping Brewster plate and one or more etalons, to a tunable optical frequency reference cavity such as a Fabry-Perot interferometer containing a path length varying means, such as a tipping Brewster plate, which serves to vary the optical path length of this reference cavity, as is disclosed in the paper entitled "Frequency Stabilization of a CW Dye Laser" by Grove, Wu and Ezekial, Proceedings of the SPIE, Vol. 49, pp. 75-79 (1975) and in the article "Direct Optical Measurement of Sodium Hyperfine Structure Using a CW Dye Laser and an Atomic Beam" by Schuda, Hercher and Stroud, 22 Applied Physics Letters No. 8, pp. 360-62 (1973). However, while this structure provides for some repeatability in frequency scanning at a specific laser nominal output radiation frequency, it has a serious deficiency for scientific purposes in its lack of any provision for calibration and adjustment of the scan width as is required when operating the laser in substantially different spectral regions.

The necessity for such calibration and adjustment stems from the manner of scanning the reference cavity and laser cavity, whereby the optical path lengths of those cavities are varied slightly, thus varying the resonant frequency of the cavity and causing the output radiation from the cavity to scan in synchronism with the cavity length changes. Inherently, when the cavity length is changed by one-half wavelength of the radiation into the cavity, the change in the resonant frequency of the cavity is equal to $c/2l$, where $c$ equals the speed of light and $l$ is the length of the cavity. By the very nature of the interferometer reference cavity only light having a frequency equal to the sum multiple of the cavity resonant frequency is transmitted out of the cavity. Thus, any change in optical length of the reference cavity will cause transmission through the cavity of a different wavelength, or frequency, of light, and a continuous variation of the cavity optical length will affect a continuous or scanning variation in the wavelength transmitted. Since the actual wavelength of the radiation is inversely proportional to its frequency and varies from one spectral region to another (and by a 2:1 ratio when going from blue at 400 nm to red at 800 nm), the amount of path length change must be recalibrated for each spectral region to obtain the proper incremental path length change to maintain the proper relationships in the relative movements of the various laser cavity scan controlling elements and the reference cavity scanning member and to obtain the desired scan width in that spectral region.

SUMMARY OF THE INVENTION

In view of the above, it is an object of the present invention to provide apparatus for continuously varying the output radiation frequency of a laser about a selected nominal output radiation frequency with a calibrated scan width. It is a further object of the invention to provide means for calibrating the laser scan width at any nominal output radiation frequency selected over the operating range of the laser. It is yet another object of the invention to provide controls for setting or changing the laser scan width which are easily and accurately adjustable by an operator thereof. It is an additional object of the invention to provide means for maintaining the proper relationships in the relative movements of the various laser cavity frequency scanning elements and the reference cavity scanning means while the output radiation frequency of the laser system is scanned.

In accordance with the present invention, in a scanning laser system including a broadband laser tunable over a range of selected output radiation frequencies and a reference cavity receiving a portion of the output radiation of the laser and having a predetermined natural resonant frequency, means are provided for continuously varying the output radiation frequency of the laser about a selected nominal output radiation frequency with a calibrated scan width. This laser output scanning apparatus includes adjustable scanning means associated with the reference cavity for varying the resonant frequency of the reference cavity, adjustable signal generating means for controlling the width of scan of the reference cavity scanning means, means displaying reference cavity resonant frequency axial modes as a function of the scan width control signal, and selectively operable means within the cavity of the laser for scanning the output radiation frequency of the laser under the control of the reference cavity scanning means. Further provided are means for setting the reference cavity scan width controlling means to provide a control signal generally corresponding to a predetermined nominal scan width and thus to a predetermined number of reference cavity axial modes while operating the laser at the selected nominal output radiation frequency without scanning, and means for adjusting the control signal generating means to adjust the number of reference cavity axial modes displayed within a predetermined range of the display. A method of calibrating the width of scan with such equipment is also disclosed, involving setting the reference cavity scan width controlling means to provide the desired control signal corresponding generally to the predetermined number of reference cavity axial modes and then adjusting the control signal to place the exact such predetermined number of axial modes within a predetermined range on the display.

BRIEF DESCRIPTION OF THE DRAWINGS

FIG. 1 is a functional block diagram in schematic form of the laser system of this invention; and FIG. 2 is a representation of the oscilloscope display of the system of FIG. 1 when the system is in calibration.

DESCRIPTION OF A PREFERRED EMBODIMENT

One embodiment of a laser system, in this case a dye laser system, incorporating the scan calibration apparatus and method of this invention is illustrated schematically in the simplified block diagram of FIG. 1. In FIG. 1 the dye laser cavity is represented as including all of the structure within the labeled broken line perimeter.

The dye stream which is excited by a pumping laser input is illustrated in cross section as item 2. In a known manner a laser beam from a pumping laser 4, which conveniently may be a continuous wave (cw) argon laser, is introduced into the dye laser cavity, off the dye laser optical axis, and is focused onto the dye stream 2 by a suitable folding mirror 6. As is well known, the focusing of such a laser beam of appropriate energy onto a stream of appropriate dye, such as Rhodamine 6G, will excite that dye stream and cause it to lase within the dye laser cavity. The resonant optical cavity of this dye laser now may be seen to be defined by end mirror 8, folding mirror 10 and partially transmissive opposite end mirror 12, with spectral range selecting birefringent filter 14, mode selecting etalons 16 and 18 and scanning element 20 interposed. Etalon 18 desirably may be an adjustable thick etalon such as is disclosed in co-pending patent application to Berg Ser. No. 692,537, filed June 3, 1976, and assigned to the assignee of this application. Etalon 16 may conveniently be a conventional thin etalon such as is well known. Cavity mirror 10 desirably is mounted to a piezo-electric element 22 which provides for adjustment of mirror 10 generally longitudinally of the dye laser cavity optical axis for adjustment of the cavity optical path length for purposes to be described below. Additionally, cavity scanning member 20 desirably may be a tipping Brewster etalon or plate, angularly adjustable with respect to the optical axis for scanning the frequency of the dye laser as described in the above-referenced paper by Schuda, Hercher and Stroud. The birefringent filter 14 suitably may be structured such as described in Yarborough et al U.S. Pat. No. 3,868,592. All of the elements 10, 16, 18 and 20 are mounted for movement in the directions indicated by the arrows on FIG. 1 in response to appropriate electrical control signals.

As also illustrated in FIG. 1, the laser beam L, upon exiting the dye laser cavity through partially transmissive member 12, encounters two beam splitters 24 and 26, which may be of conventional configuration. These beam splitters 24 and 26 serve to split off portions $L_{R1}$ and $L_{R2}$, respectively, of the laser beam L for reference purposes, while passing portion $L_O$ of the beam as the dye laser output. Reference beam $L_{R1}$, reflected off beam splitter 24, is folded again by mirror 28, directed through intensity attenuator 30 and then onto first radiation detector 32. The second reference beam, $L_{R2}$, is folded by mirror 34 into reference cavity 36. The resonant cavity 36 is of conventional structure and may conveniently be dimensioned to have a spacing between resonant frequencies (or axial modes) of 250 MHz. Within the reference cavity is also provided a scanning member 38 substantially similar to the tipping Brewster plate 20 in the dye laser cavity. This tipping Brewster plate 38 may be used to adjust the total optical path length of the reference cavity 36 in a manner and for a purpose to be described below. As is well known, the portions of reference beam $L_{R2}$ which comprise multiples of the resonant frequency (axial modes) of reference cavity 36 are then transmitted out of the cavity and may be directed onto second radiation detector 40. The intensity attenuator 30 through which reference beam $L_{R1}$ passes is selected to reduce the intensity of the beam $L_{R1}$ to approximately equal the intensity of the portion of beam $L_{R2}$ transmitted by the reference cavity 36.

The signals from detectors 32 and 40 are fed into differential amplifier 42 for creation of an error signal indicating any variation between the desired frequency at which the reference cavity is controlled and the actual resulting dye laser output frequency. The frequency error signal out of differential amplifier 42 is then applied through switch 43 to a suitable automatic gain control (AGC) 44, when that switch 43 is in its normal operating (solid line) position, and then to the frequency controlling elements 10, 16, 18, and 20 of the dye laser. This feedback signal, acting through suitable known drivers and transducers, such as piezo-electric devices associated with the frequency control elements, causes adjustment of those control elements to stabilize the frequency and scan of the dye laser under the control of the reference cavity 36, in the manner disclosed in "Frequency Stabilization of a CW Dye Laser" by Barger, Sorem and Hall, 22 Applied Physics Letters No. 11, pp. 573-575 (1973) and in the paper by Grove, Wu and Ezekiel, referenced above.

While the above described structure provides for frequency stabilization of the dye laser at a frequency controlled by the reference cavity 36, the laser system is most useful by virtue of its ability to continuously vary the frequency of the laser output in a manner controlled by an operator. This scanning is achieved by continuously varying the orientation of Brewster plate 38 within the reference cavity, and thus of the laser cavity control elements 10, 16, 18, and 20 which are slaved to reference cavity changes, thereby varying the frequency of the laser beam L that may resonantly be fitted within both the laser cavity and the reference cavity 36, and thus effecting a scan of the transmission and output frequencies of the reference cavity and of the laser cavity. The scan of Brewster plate 38 is controlled by an electrical ramp signal that is applied to the rotatable mount or stage 48 upon which the Brewster plate 38 is mounted. The ramp signal applied to this stage is generated by ramp generator 50 and is applied through either calibration signal source 54 or operator changeable scan width control 56 to differential amplifier 57 and through potentiometer 52 to the mount 48. A DC signal from operator changeable scan offset control 58 is also applied to differential amplifier 57. A single-throw gang switch 60 is provided for selective connection between the differential amplifier 57 and either calibration signal source 54 (broken line representation) or operator changeable controls 56 and 58 (solid line representation), thus providing for preemption of the operator changeable controls whenever the calibration signal source 54 is engaged. This switch 60 is ganged with or slaved to switch 43, supra, to provide for simultaneous operation of the two switches.

The operator changeable controls 56 and 58 for controlling the scan of the reference cavity and of the dye laser cavity conveniently may be detented, thumbwheel potentiometers having a digital display of their settings. Potentiometer 56 functions as a multiplier (or attenuator) on the ramp signal generated by fixed ramp generator 50. Control 56 represents the scan width control, controlling the amount of movement of the reference cavity and dye laser cavity scanning elements. This scan width is controlled by adjustably controlling the height of the ramp signal generated by generator 50. For purposes of this explanation, it may be assumed that the time base and thus the width of the ramp and scan time remain constant. Control 58 represents the scan offset control for controlling the offset of the center point of scan from the center point of the laser output being scanned. This offset control conveniently may function by applying a positive or negative pedestal voltage of adjustable magnitude to the ramp signal through the differential amplifier 57, thus effecting an equal shifting of the starting and ending points of any scan of a given scan width. The calibration signal control device 54 may simply be a fixed attenuator providing a predetermined attenuation to the ramp generator signal, thereby providing a predetermined signal corresponding to a predetermined nominal scan width, suitably having zero offset. While this calibration signal function could satisfactorily be performed by proper setting of controls 56 and 58, the provision of a separate preset control device 54 facilitates quick and easy calibration of the system at any setting of controls 56 and 58 without disturbing their settings. In such a case application of the calibration signal to the differential amplifier 57 is effected simply by placing gang switch 60 in the position indicated by the broken line in FIG. 1, removing any signals from controls 56 and 58 from the differential amplifier 57.

It may be noted that differential amplifier 57 is indicated on FIG. 1 as being functionally connected to ajustable etalons 16 and 18 and to tipping Brewster plate 20, in addition to the connection of those structures to the feedback loop. This connection from the differential amplifier provides a "feed-forward" signal, suitably conditioned, to effect substantially simultaneous appropriate variations in the tuning positions of laser cavity control etalons 16 and 18 and Brewster plate 20 as the control devices command a change in the positioning of reference cavity Brewster plate 38, whenever gang switch 60 is in its operator changeable control (solid line) position. Thus, when the system is operating under the command of the operator changeable controls 56 and 58, and those controls 56 and/or 58 command a certain scan of reference cavity Brewster plate 38, the same scanning variation is commanded of the laser cavity scanning elements 16, 18 and 20 in a manner that maintains the proper relationships in the relative movements of these elements to prevent any relative shift in the optical pass frequencies among these elements during a scan. By virtue of this feed-forward arrangement the requirements on the feedback control loop are reduced just to those of fine adjustment rather than being required to provide all scanning change of the laser cavity. Additionally, if desired, the feedback loop may be opened and the laser output radiation scanned with the reference cavity through the feed-forward circuit. When the reference cavity scan is being calibrated under the control of calibration signal source 54, scan of the laser cavity is not desired. Accordingly, when switch 60 (and slaved switch 43) is placed in its calibrate (broken line) position, the feed-forward (and feedback) connections to the laser cavity are opened.

Obviously, various signal conditioning components and devices not illustrated in FIG. 1 would be required for the detailed construction of such a feed-forward and feedback loop arrangement. However, such circuitry and components are believed to be sufficiently conventional as to be well within the ability of one skilled in the art of control loop circuits.

An oscilloscope 62 having a horizontal drive input from the ramp generator 50 time base and a vertical drive input from the output of detector 40 is provided for reasons described below.

While operation of such a scanning arrangement for a conventional narrow band width laser, such as the well known helium-neon or argon lasers, would permit initial calibration of the scan width of the system without the necessity for recalibration, such is not the case with a broadband laser such as a dye laser. This dye laser finds its great usefulness in such fields as precision spectroscopy by virtue of its characteristic of being tunable over a broad range of output wavelengths, from blue at about 400 nanometers (nm) to red at almost 800 nanometers (nm). This broadband capability requires recalibration of the scan width control due to the means used for scanning the system — continuously varying the optical path length of the reference cavity and the laser cavity. By varying the optical path length of the laser cavity, the resonant frequency of the laser cavity is similarly varied. Since the wavelength (or frequency) of the laser beam L emanating from the dye laser cavity is of the wavelength (or frequency) corresponding to the resonant frequency of the laser cavity, the varying of this cavity path length thus effects the scanning of the frequency of the laser beam. By virtue of the feedback arrangement, described above, the resonant frequencies or modes of the laser cavity and of the reference cavity are directly linked. Further, since the resonant frequencies of both cavities are those frequencies at which some integral number of half wavelength of the subject radiation (the laser beam) may be fitted within the cavity, it is important for maintaining the given scan width that the range of movement of the reference cavity Brewster plate 38 be adjusted and calibrated. This is so because a given angular movement of the Brewster plate 38 will always effect the same increase in optical path length in the reference cavity while the wavelengths of the radiation of interest, $L_{R2}$, may vary from 400 nanometers to 800 nanometers. Since the resonant frequency of the reference cavity is equal to $c/2l$, where $c$ is the speed of light and $l$ is the length of the cavity, a different cavity optical path length change is required to maintain a constant scan width in one spectral region (e.g., 400 nm) than is required to maintain that same constant scan width in a different spectral region (e.g., 800 nm). Accordingly, for any significant changes in spectral region it is desirable to recalibrate the scan width of such a system to ensure the accuracy of scan width. This calibration is effected by calibration control signal source 54, calibration potentiometer 52 and oscilloscope 62 working in conjunction with the laser system. The operation of this calibration apparatus may be carried out with the laser set (by means of the birefringent filter 14 and other control elements) for any desired spectral region by placing switches 43 and 60 in their calibrate (broken line) positions so that the laser is "free running" at some nominal output radiation frequency without scanning.

Since the reference cavity has a predetermined spacing between resonant frequencies, or operating modes, the cavity will transmit light only when the light is at the operating mode of the cavity. For a cavity having resonant frequency spacings of, conveniently, 250 MHz, the detector 40 receives energy and generate an output signal only when the frequency of the radiation within the cavity is at some multiple of 250 MHz. Accordingly, when the vertical input of oscilloscope 62 is connected to the output of detector 40, with the horizontal input connected to the time sweep of the ramp generator 50, signals will be produced in the form of spikes on the oscilloscope display during the scan of the reference cavity only as a resonant frequency or axial mode of the cavity is passed (spaced 250 MHz apart) during the scan. For a scan of 2.5 GHz (10 × 250 MHz) there thus will be 11 axial modes (spikes), with a total of ten 250 MHz spaces between them, displayed across the face of the oscilloscope 62. This will be true regardless of the spectral range of operation of the dye laser. However, as noted above, the magnitude of excursion of the tipping Brewster plate 38 in the reference cavity must be adjusted for the various spectral regions of operation. This adjustment, and thus calibration, is achieved by inserting a predetermined calibration ramp signal from calibration signal source 54 into the differential amplifier 57. Conveniently, such calibration signal may be that corresponding to the operator changeable control for a scan width of 2.5 GHz. Then, if the system is in calibration, the detector input to the vertical drive of the oscilloscope and the ramp generator time base input to the horizontal drive of the oscilloscope 62 will cause exactly 11 axial modes to be displayed as spikes across a predetermined width of the oscilloscope display, generally as illustrated in FIG. 2. If a greater or lesser number of reference cavity axial modes is displayed across the predetermined width of the oscilloscope face, the signal controlling the reference cavity scan may be adjusted by adjusting potentiometer 52 until the desired number of modes is displayed across the desired width. At this point, since the oscilloscope displays the reference cavity axial modes as a function of the cavity scan width, the differential amplifier and thus the movement of the Brewster plate 38 will be calibrated at the calibration scan width (in this case, 2.5 GHz) for the spectral range of interest, and switches 43 and 60 may be returned to their operating (solid line) positions. Since the operator selectable scan width control 56 operates as a signal multiplier or attenuator when applied to the fixed output ramp generator 50 and the now-calibrated differential amplifier 57, the same calibration will be effected for all scan widths in that spectral region. Also, since the adjustment of the calibration potentiometer 52 effects a correction of the signals both to the reference cavity and the oscilloscope and also to the feed-forward circuit, such adjustment also provides for calibration of the laser cavity frequency controlling elements 16, 18 and 20 and maintains the accuracy of their relative movements during scanning. In this manner, the scan of the laser may be calibrated and the control of the scanning switched from the calibration source back to the operator changeable controls to allow the dye laser to be scanned throughout its range of operation.

The foregoing description of a preferred embodiment of the apparatus and method of this invention is intended to be illustrative only of the principles of the invention and not to be limitative thereof. Accordingly, since numerous variations of the apparatus and method of this invention, within the scope of the invention, will readily become apparent to those skilled in the art, the scope of this invention is to be limited, not by the foregoing description but, solely by the claims appended hereto.

We claim:

1. In a scanning laser system including a broadband laser tunable over a range of selected output radiation frequencies and a reference cavity receiving a portion of the output radiation of said laser and having a predetermined spacing between natural resonant frequencies, means for continuously varying the output radiation frequency of said laser about a selected nominal output radiation frequency with a calibrated scan, comprising adjustable scanning means associated with said reference cavity for varying the resonant frequency of said reference cavity, adjustable signal generating means for controlling the scan of said reference cavity scanning means, means displaying resonant frequency axial modes of said reference cavity as a function of said scan width, selectively operable means within the cavity of said laser for scanning the output radiation frequency of said laser under the control of said reference cavity scanning means, means, operable while said laser is being operated at said selected nominal output radiation frequency without operation of said laser cavity scanning means, for setting said reference cavity scan controlling means to provide a control signal generally corresponding to a predetermined nominal scan width and thus to a predetermined number of reference cavity axial modes, and means for adjusting said control signal generating means to adjust the number of reference cavity axial modes displayed within a predetermined range of said display, whereby adjustment of said adjusting means to place the exact said predetermined number of reference cavity axial modes within the display predetermined range serves to calibrate the scan controlling signal and thus the scan of the reference cavity scanning means for an incremental frequency scan at such laser nominal output radiation frequency.

2. Laser system apparatus according to claim 1 wherein said scan control signal generating means comprises means for generating an electrical ramp signal with the height of said ramp controlling the width of scan of said reference cavity scanning means and wherein said control signal adjusting means comprises means for adjusting the height of said ramp signal, whereby the ramp height and thus the scan may be adjusted to provide the proper scan width corresponding to said scan width control means setting, thus calibrating the scan width control signal with the actual scan width at that setting.

3. Laser system apparatus according to claim 1 wherein said reference cavity scan control signal generating means comprises operator changeable means for selecting any of a preselected range of scan widths for system operation and wherein said setting means for said controlling means comprises selectively engageable calibration means, which upon engagement, preempts control by said operator changeable means and provides a predetermined scan width control signal, whereby engagement of said calibration means effects setting of the reference cavity scan controlling means to provide a control signal corresponding to the predetermined nominal scan width for calibration of the system.

4. Laser system apparatus according to claim 3 wherein said scan control signal generating means further comprises means for generating an electrical ramp signal with the height of said ramp controlling the width of scan of said reference cavity scanning means, and wherein said control signal adjusting means comprises means for adjusting the height of said ramp signal, whereby the ramp height and thus the scan width may be adjusted to provide the proper scan width corresponding to the scan control means setting and to the calibration means signal when engaged, thus providing for calibration of the ramp signals as a function of scan width for that predetermined calibration scan width.

5. Laser system apparatus according to claim 4 wherein said operator changeable scan width control signal generating means comprises means for selectively and controllably multiplying said ramp signal height, whereby calibration of the ramp signal for the predetermined calibration scan width control signal may serve to calibrate any such multiplied operator selected scan width control signal.

6. Laser system apparatus according to claim 1 wherein said reference cavity axial mode displaying means comprises an oscilloscope displaying a signal representing the radiation transmitted by said reference cavity as a function of said scan width.

7. Laser system apparatus according to claim 6 wherein said predetermined nominal scan width equals ten times said spacing between natural resonant frequencies of said reference cavity, whereby eleven reference cavity axial modes may be displayed across the oscilloscope display when the calibration means is engaged and the system scan width is in calibration.

8. Laser system apparatus according to claim 1 wherein said laser cavity output radiation scanning means comprises a plurality of movable scanning elements and wherein said control signal adjusting means further comprises means for adjusting the movements of said laser cavity scanning elements, whereby adjustment of said adjusting means to calibrate the scan of the reference cavity may serve also to calibrate scanning of the laser cavity.

9. For a scanning laser system including a broadband laser tunable over a range of selected output radiation frequencies, a reference cavity receiving a portion of the output radiation of said laser and having adjustable scanning means for varying the resonant frequency of said reference cavity, adjustable signal generating means for controlling the scan of said reference cavity scanning means, means for displaying reference cavity resonant frequency axial modes as a function of said scan width control signal, and selectively operable means within the cavity of said laser for scanning the output radiation frequency of said laser under the control of said reference cavity scanning means, the method of calibrating the width of scan of the system about a selected nominal output radiation frequency, comprising operating said laser at said selected nominal output frequency without scanning, setting said reference cavity scan controlling means to provide a control signal generally corresponding to a predetermined nominal scan width having a predetermined number of reference cavity axial modes, and adjusting said control signal to place the exact said predetermined number of reference cavity axial modes within a predetermined range of said display, whereby, for such nominal output frequency the magnitude of the control signal and thus of the scan of said reference cavity scanning means for an incremental scan width may be calibrated.

10. The scan width calibration method of claim 9 wherein said signal generated by said reference cavity scan width controlling means comprises an electrical ramp signal with the height of said ramp controlling the width of scan of said reference cavity scanning means, and wherein said adjusting of said control signal comprises adjusting the height of said ramp signal, whereby the width of scan of the reference cavity scanning means may be adjusted to calibrate the ramp height per unit scan width.

11. The scan width calibration method of claim 10 wherein said reference cavity signal generating scan controlling means includes both operator changeable means for selecting any of a preselected range of scan widths for system operation and selectively engageable calibration means which, upon engagement, preempt control by said operator changeable means and provide a predetermined scan width control signal, and wherein engagement of said calibration means effects said setting of said reference cavity scan controlling means to provide said control signal corresponding to said predetermined nominal scan width for calibration of said system.

* * * * *